United States Patent
Middleton et al.

(10) Patent No.: US 8,926,176 B2
(45) Date of Patent: Jan. 6, 2015

(54) MODULAR THERMOWELL AND METHOD

(75) Inventors: Peter Mark Middleton, Houston, TX (US); Larry A. Quick, Houston, TX (US)

(73) Assignee: PGI International, Ltd., Houston, TX (US)

(*) Notice: Subject to any disclaimer, the term of this patent is extended or adjusted under 35 U.S.C. 154(b) by 8 days.

(21) Appl. No.: 13/563,097

(22) Filed: Jul. 31, 2012

(65) Prior Publication Data

US 2014/0036960 A1    Feb. 6, 2014

(51) Int. Cl.
*G01K 1/00*     (2006.01)
*B23K 20/12*    (2006.01)

(52) U.S. Cl.
USPC ........ 374/208; 228/112.1; 228/285; 228/21.1

(58) Field of Classification Search
USPC ......... 374/208, 12, 192, 194, 209; 228/112.1; 29/525.14, 890.03
See application file for complete search history.

(56) References Cited

U.S. PATENT DOCUMENTS

| | | | |
|---|---|---|---|
| 3,134,278 A | | 5/1964 | Hollander et al. |
| 3,235,162 A | | 2/1966 | Hollander |
| 3,618,196 A | * | 11/1971 | Sluetz ............................ 228/113 |
| 5,636,875 A | * | 6/1997 | Wasser .......................... 285/21.1 |
| 5,707,152 A | * | 1/1998 | Krywitsky ..................... 374/208 |
| 5,999,081 A | * | 12/1999 | Hannigan et al. ................ 338/28 |
| 6,352,361 B1 | * | 3/2002 | Nimberger et al. ........... 374/142 |
| 6,514,631 B1 | * | 2/2003 | Yamamoto et al. ............ 428/682 |
| 7,011,446 B2 | * | 3/2006 | Park ............................... 374/208 |
| 7,465,086 B1 | * | 12/2008 | Foreman, Jr. ................... 374/143 |
| 2001/0029651 A1 | * | 10/2001 | Fulbright .................. 29/243.522 |
| 2008/0025372 A1 | * | 1/2008 | Culbertson et al. ........... 374/185 |

* cited by examiner

*Primary Examiner* — Lisa Caputo
*Assistant Examiner* — Nasir U Ahmed
(74) *Attorney, Agent, or Firm* — Renner, Otto, Boisselle & Sklar, LLP (57) ABSTRACT

A thermowell is provided for positioning on a pipeline or tank to measure the temperature. The thermowell comprises a head for receiving a probe, and the well has a closed end. An elongated hollow tubular connects the head and the well. The tubular includes one or more tubular parts, each of a selected axial length, joined by a friction welding to one of the more of the head, the well or another of the tubular parts.

14 Claims, 7 Drawing Sheets

MODULAR THERMOWELL AND METHOD

FIELD OF THE INVENTION

This invention relates to thermowells of the type used in tanks and pipelines to measure fluid temperature. More particularly, a modular thermowell is disclosed which allows the length of a thermowell to be selected from a variety of lengths, and allows the well to be selected to achieve desired thermowell features.

BACKGROUND OF THE INVENTION

Most thermowells are machined from a single solid material. While use of such a single material is advantageous for durability and accuracy in thermal measurements, single piece thermowells are expensive to manufacture, particularly since customers desire the ability to select the length of the thermowell for their application, and to utilize a desired well construction. Accordingly, large numbers of thermowells must be maintained in inventory by the manufacturer to satisfy the various needs of the customer.

Friction welding using a pre-determined stored energy in a rotating mass or flywheel has been used to form a weld. The flywheel allows for more precise welds and also uses the minimum amount of energy to achieve the needed result. The flywheel can be "tuned" to the optimum point when the weld friction overcomes the remaining inertia motion of the flywheel. This method produces a joint that is as strong as or better than the base metal and will not be susceptible to cracking or being fatigued by the extreme forces. Friction welding machine are disclosed in U.S. Pat. Nos. 3,134,278 and 3,235,162.

The disadvantages of the prior art are overcome by the present invention, an improved modular thermowell is hereinafter disclosed.

SUMMARY OF THE INVENTION

The present invention relates to the construction of thermowells or temperature probes in a modular fashion to have a desired length and configuration. In one embodiment, a welded connection may be used. Flanged, threaded, welded, tapered, or a straight design of a thermowell head may be used for taking a temperature from within a tank, or from a pressurized or unpressurized pipeline. The thermowell may or may not be subject to stresses induced from fluid pressure and fluid flow. These conditions allow the manufacturer to produce thermowells of any desired length using a modular piece-wise basis, while maintaining the strength and integrity of a similarly designed one piece thermowell machined from a single solid material.

Creating modularity within the thermowell production process thus allows for differing combinations of thermowell "heads" and "wells" to be stocked and quickly produced per customer demand to virtually any length. Provided the inside diameter and outside diameter of the main well section are the same configuration, any combination of thermowells components can be "welded" or otherwise "connected" mechanically in a very short time-frame while maintaining the overall integrity.

These and further features and advantages of the present invention will become apparent from the following detailed description, wherein reference is made to the figures in the accompanying drawings.

DETAILED DESCRIPTION OF PREFERRED EMBODIMENTS

Figure 1:
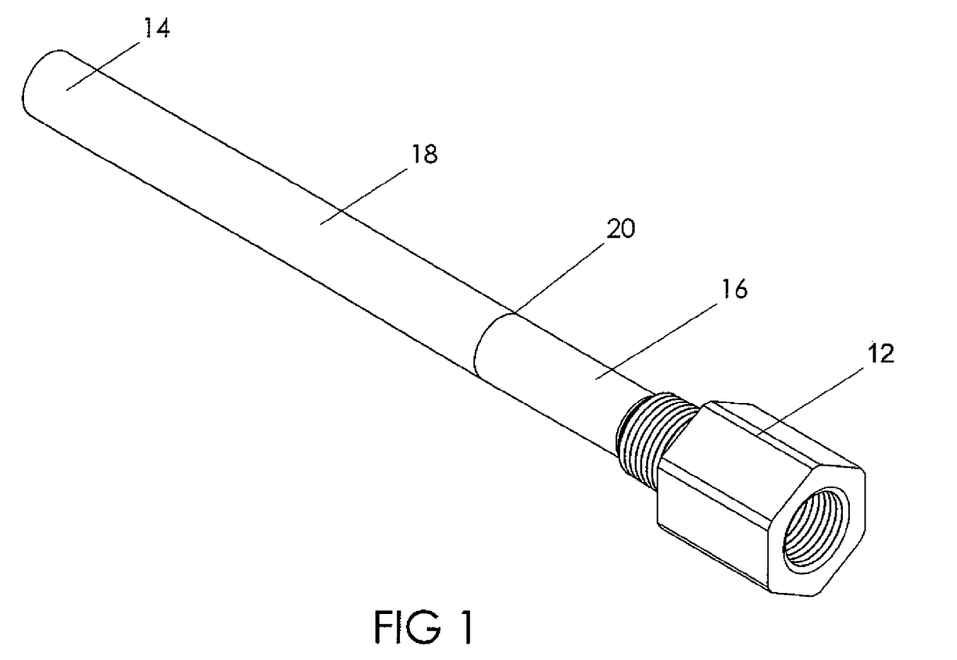
FIG. 1 is an isometric view of a finished friction welded thermowell.

The friction welding method outperforms current welding solutions that can sometimes force thermowells to be de-rated when subjected to a traditional TIG or MIG welding processes. The friction weld process allows a full rating of thermowells based on the materials of construction while gaining the ability construct them modularly into any desired length with a short lead time. FIG. 1 shows a constructed thermowell with a head 12 and a well 14. Attached by threads to the heads 12 is a short, hollow tubular 16. The well 14 includes a longer, hollow tubular 18. These two sections 16, 18 are joined by friction weld 20.

Figure 2:
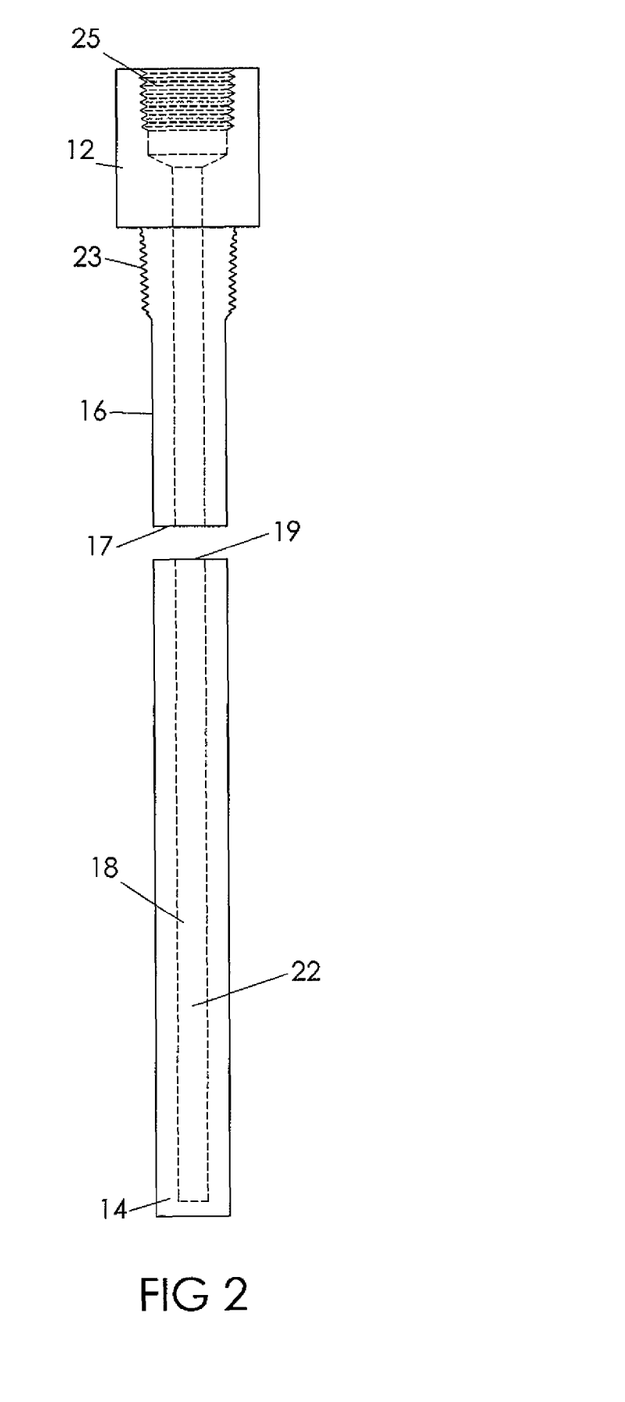
FIG. 2 illustrates the two parts of the thermowell before being joined.
Figure 3:
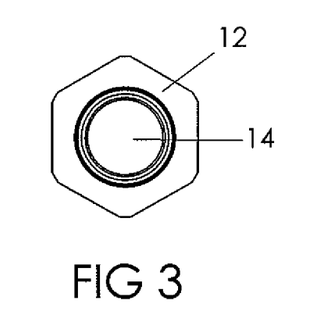
FIG. 3 is a top view of the finished thermowell.
Figure 4:
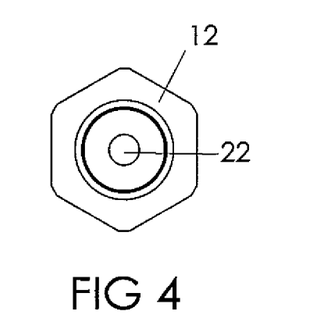
FIG. 4 is a bottom view of the finished thermowell.

Two parts, the "head" 12 and the "well" 14 may be locked in place during manufacturing using collets. One part (typically the "head") is spun up to a predetermined rotational speed in the collet attached to a flywheel. The other part remains stationary. Once up to speed, the "head" is touched to the "well" to build friction. At a second predetermined point, the two parts are "forged" together using a force dictated by the O.D. and I.D. of the parts being joined (typically 3-10 tons) permitting intermolecular penetration, causing a weld to be formed on the molecular level between the "head" and the "well". The planar end surfaces 17 and 19 as shown in FIG. 2 are thus substantially parallel and have aligned ring-shaped end surfaces. The remaining flywheel inertia is then overcome by the strength of the weld as it begins to cool due to the forging pressure being released. The whole assembly ceases rotation at a pre-determined point and a final forge process may occur using the same hydraulic pressure. Once sufficient cooling has taken place, while still on the same machine, the part may be finish machined to remove the excess extruded metal outside the thermowell weld, and drilled or gun-drilled to remove the excess metal inside the thermowell passageway 22. The parts are shown prior to welding in FIG. 2. FIG. 3 is a top view of the thermowell showing the elongate passageway 22 for receiving a probe positioned within the well. The thermowell depicted in FIG. 2 has external threads 23 for mounting to a pipeline or container. The head 12 includes internal threads 25 for attaching a conventional probe (not shown) to the thermowell. Flanged thermowells may to be joined in the same method with different tooling. Various types of thermowells may be made in this manner.

The method of friction welding allows thermowells to be built to any desired length either by using the modular sequential assembly of pre-determined lengths, or by welding a "head" and a "tip" or a "well" configuration onto a pipe of a pre-determined length, thereby reducing or eliminating the need for the inner flash to be removed on the considerably longer parts. This would also reduce the number of welds and the outer flash removal processes.

The friction weld method also allows for different configurations on the end tip or "well". A finned thermowell can detect changes in temperatures far faster than a conventional thermowell, and this method allows for modularity, and the ability to switch between tip configurations quickly and easily during production.

Figure 5:
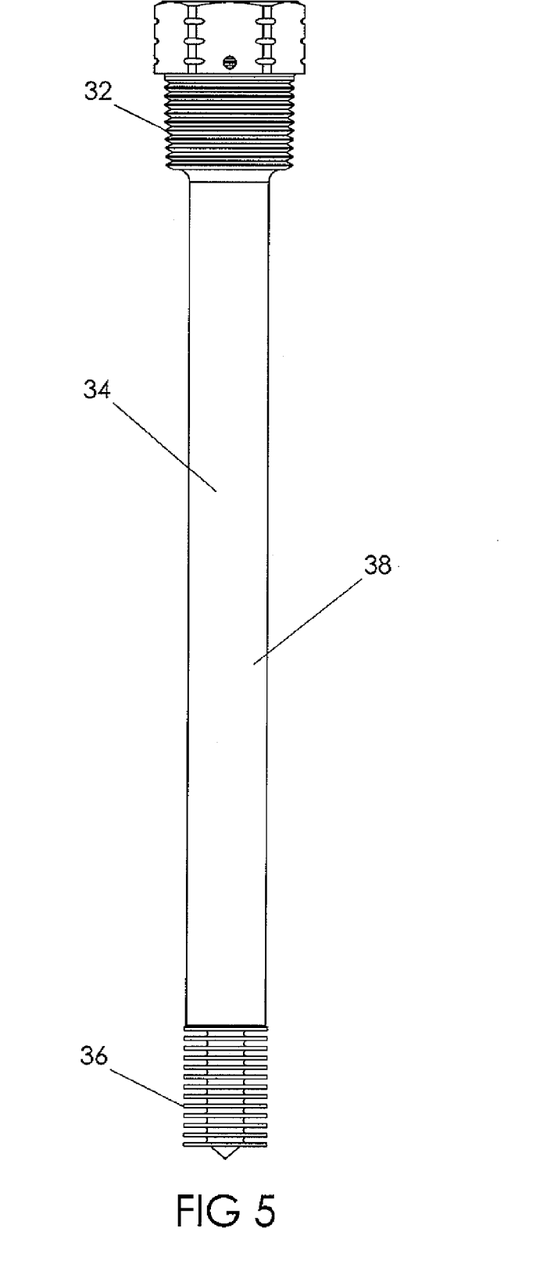
FIG. 5 illustrates other parts of a thermowell before welding.

FIG. 5 illustrates another version of a thermowell prior to friction welding. Head 32 has a relatively short length, and well 34 includes fins 36 for better measurement accuracy, both the head 32 and the well 34 may have a standard length. Tubular section 38 joins to both head 32 and well 34, and its length may be adjusted to accommodate the desired length of the thermowell. By making the well a standard and relatively short length, the length of the drilled bore is the well 34 may be relatively short, thereby requiring little machining. The length of the tubular section 38 may be comparatively long, but since its bore is continuous between its ends, the tubular section 36 may be fabricated from standard tubular stock, and thus the length of the bore is tubular section 38 need not be machined.

There are two main types of thermowells. The type used in pipes are generally thick walled and need to be extremely strong to overcome the high loads seen at high fluid flow rates up to 100 ft/sec. The second type of thermowell is a tank thermowell. Tank thermowells typically have a thinner wall thickness and are generally not subjected to the loads that may exist in a pipeline application. Pipe thermowells are also generally of a much greater length. The friction weld method can also be applied to tank thermowells. Tank thermowells need to be machined into slightly different configurations, however, as machining the flash out at the bottom of a 20 foot tank thermowell could prove problematic.

Figure 6:
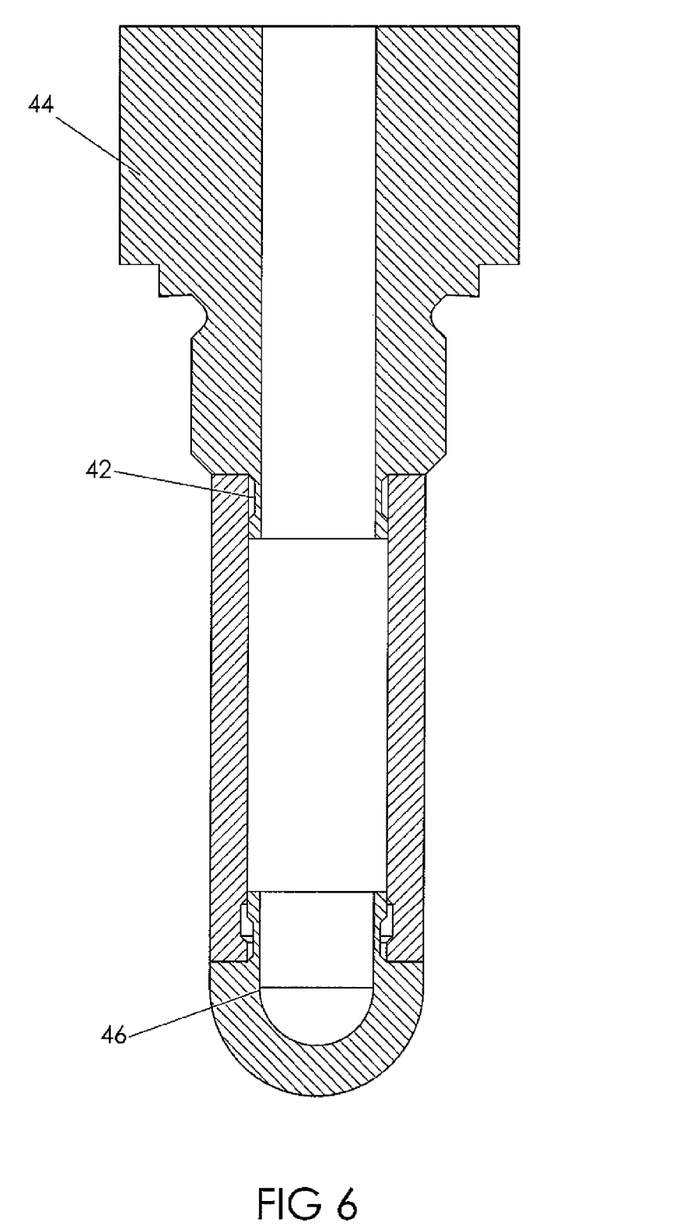
FIG. 6 illustrates a thermowell with a containment area.

The proposed method overcomes this problem using a containment area 42, such as an annular groove as shown in FIG. 6, for receiving welding flash between the parts. Inner flash may occupy axial 42 and thus need not be removed from the passageway in the thermowell. This still results in a thicker weld connection than conventional and therefore can still be considered a performance enhancer, removing the need for a TIG setup and associated labor costs, while providing a way to weld the tank thermowells without producing an inner weld flash that needs to be removed.

The friction welding process is faster, cheaper and will produce a more dependable part than conventional welding. There is no need for a cleanup on the part prior to friction welding. The finished weld is as strong or stronger than the base metal, and the process once determined is completely repeatable with high precision and very little variation in quality.

The friction welding process allows for differing combinations of thermowell "heads" and "wells" to be stocked and quickly produced per customer demand. Provided the inside diameter and outside diameter of the main well section are the same configuration, any combination of thermowells can be "welded" in a very short time-frame. The possible use of robotics to fully automate the process will also reduce lead times. The ability to make any size thermowell for any application in several days or less by pre-stocking specific sizes will reduce the current lead times considerably and produce a high quality product that is cheaper to manufacture yet can demand a premium from the customer due to the highly competitive lead times.

The designs disclosed herein join parts using a friction welding method. The parts will be cut into desired lengths and added as needed to make up the overall thermowell length, with a friction weld being performed on each joint until the final length of the thermowell is made. In addition, the top or "head" of the thermowell can be configured as needed, i.e., flanged, threaded or welded, and the bottom end or "well" can be configured to fit any desired length or other customer specific need such as squared, curved, or finned.

The friction welding process may be used for forming various types of thermowells for mounting to a pipeline or tank, including thermowells with the well selected from various well configurations, including finned thermowells and non-finned thermowells. Wells are conventionally provided with a closed end, and the head preferably includes internal thread for mating with a probe. An upper end of the elongate hollow tubular includes an external thread for engagement with the pipeline or the tank. According to the method, one of the head and the well of the thermowell is rotated relative to the other of the head and the well, with the separated parts joined at a desired length along the elongate hollow tubular. The rotating and the stationary tubular parts are thus brought into frictional engagement under an axial force, and friction from the rotating and non-rotating parts and the applied force reliably connect the parts of the thermowell together by the friction weld. The inventory of thermowell parts can be substantially reduced since a selected head and a selected well, along with a selected axial length tubular for connecting the head and the well, may thus be used to form desired configuration thermowell.

Figure 7:
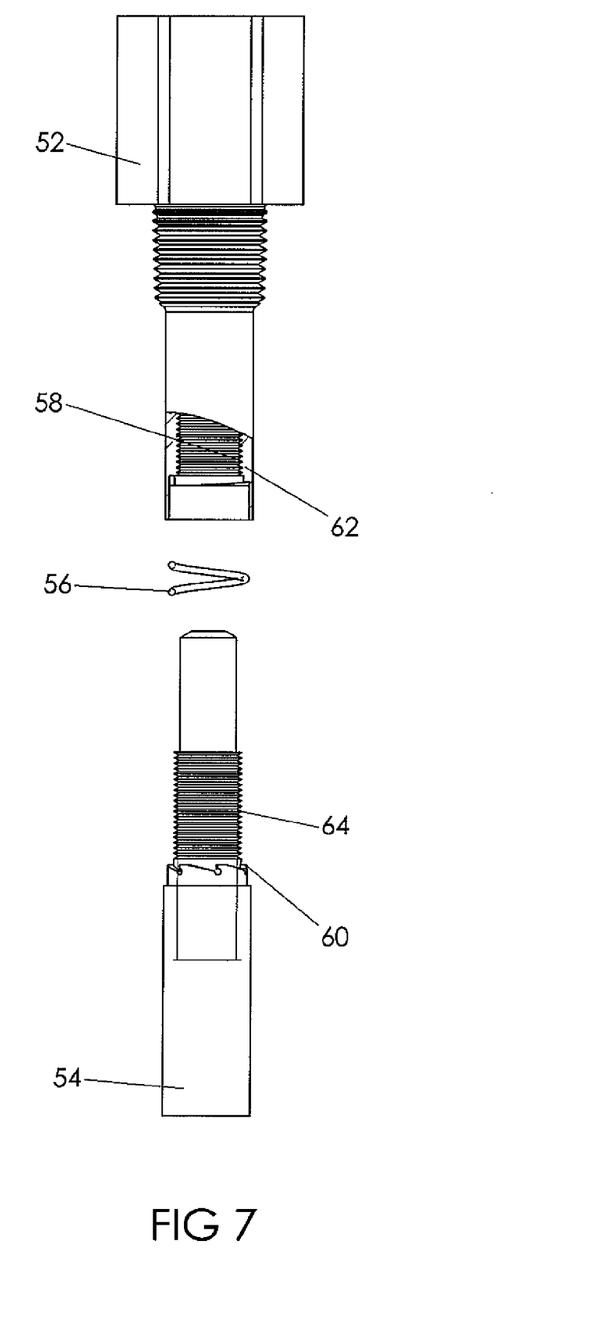
FIG. 7 illustrates the components of a spring lock thermowell.

The method of joining thermowell parts shown in FIG. 7 includes head 52 and a well 54. A spring 56 is contained between two opposing faces to prohibit the well 54 of the thermowell from being able to unthread from the head 52, thus ensuring its retention and sealing capabilities. Once assembled, the spring 56 locks to a notch 58 attached to the head 52, and to the teeth 60 attached to the well, thereby preventing threads 62 and 64 attached to the head and the well from unthreading.

Figure 8:
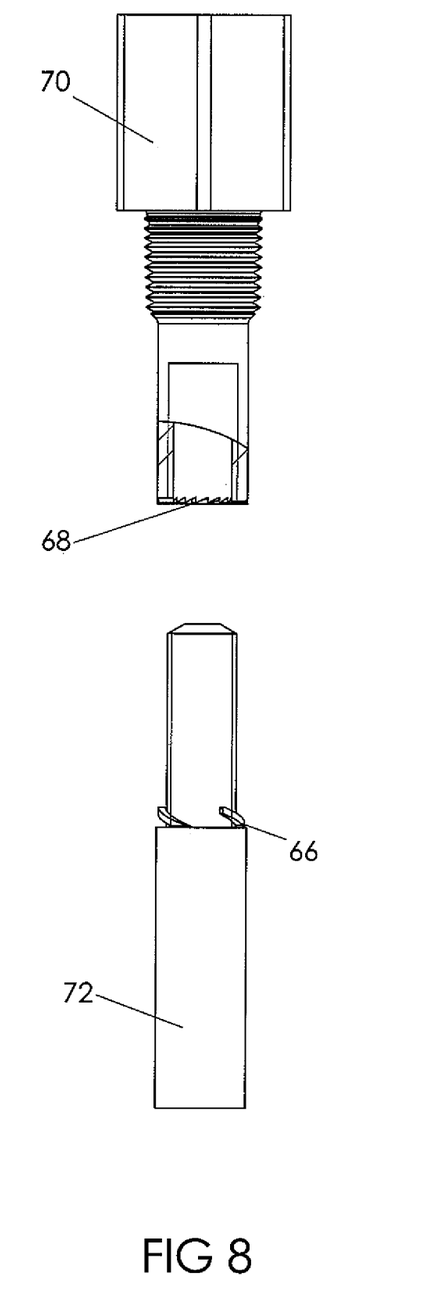
FIG. 8 illustrates an alternative spring lock thermowell.

The method of joining shown in FIG. 8 uses an integral spring lock 66 machined as one piece into the end steps or teeth 68 machined integrally into the head 76 to guarantee that the well 72 of the thermowell will not be able to unthread from the head, thus ensuring its retention and sealing capabilities.

An alternative method of joining two or more parts of a thermowell may use a thread on the end piece that allows a screw to secure the well to the well head. Two set screws may be inserted from above to prevent the end piece from unthreading, ensuring the retention and sealing capabilities.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A thermowell for positioning on a pipeline or tank to measure fluid temperature, comprising:
    a head for receiving a probe therein;
    a well having a closed end;
    an elongate hollow tubular interconnecting the head and the well;
    the tubular including one or more tubular parts each of a selected axial length joined by a friction weld to one or more of the head, the well, or another of the tubular parts;
    a passageway defined by the head, well, and tubular; and
    at least one containment area separated from the passageway and bounded on all sides between a radially outer portion of the tubular and a radially inner portion of the head or the well which is received in the radially outer portion of the tubular, wherein friction weld flash is contained in the containment area for preventing friction weld flash from entering the passageway.

2. The thermowell as defined in claim 1, wherein the well includes fins.

3. The thermowell as defined in claim 1, further comprising:
a containment area radially interior of the elongate tubular and exterior of the head for receiving flash from the friction weld.

4. The thermowell as defined in claim 1, wherein the head includes an internal thread for mounting with a probe.

5. The thermowell as defined in claim 1, wherein an upper end of the elongate hollow tubular includes an external thread for engagement with the pipeline or tank.

6. The thermowell as defined in claim 1, further comprising:
welding flash in the containment area.

7. The thermowell as defined in claim 1, wherein the containment area is located radially between axially overlapping portions of the tubular part and the head, the well, or another of the tubular parts to which the tubular part is welded.

8. The thermowell as defined in claim 7, wherein the containment area is formed by an annular groove in one of the axially overlapping portions.

9. A method of forming a thermowell for positioning in a pipeline or tank to measure fluid temperature, comprising:
providing a head mounting the thermowell to the pipeline or tank;
providing the thermowell with a well having a closed end;
providing an elongate hollow tubular for interconnecting the head and the well;
rotating one of the head or the well relative to the other of the head and or the well to interconnect the head and the well by a friction weld; and
containing friction weld flash within a containment area separated from a passageway through the head, elongate hollow tubular, and well, the containment area being bounded on all sides between a radially outer portion of the elongate hollow tubular and a radially inner portion of the head or the well received in the radially outer portion of the elongate hollow tubular, wherein friction weld flash is contained in the containment area for preventing friction weld flash from entering the passageway.

10. The method as defined in claim 9, further comprising:
selecting the well for the thermowell from a variety of well configurations.

11. The method as defined in claim 9, further comprising:
providing an internal thread on the head for receiving a probe.

12. The method as defined in claim 9, further comprising:
providing an external thread on the elongate hollow tubular for engagement with the pipeline or tank.

13. The method as defined in claim 9, further comprising:
receiving welding flash from the friction weld in a containment area located radially between axially overlapping portions of the tubular part and the head, the well, or another of the tubular parts to which the tubular part is welded.

14. The method as defined in claim 9, further comprising:
preventing welding flash from entering a passageway of the thermowell for receiving a probe therein.

\* \* \* \* \*